US012743408B2

(12) United States Patent
Jiang et al.

(10) Patent No.: US 12,743,408 B2
(45) Date of Patent: Sep. 22, 2026

(54) DEVICE ORDER DATA STORAGE METHOD AND APPARATUS, AND DEVICE ORDER DATA QUERY METHOD AND APPARATUS

(71) Applicant: THINKCAR SOFTWARE TECHNOLOGY DEVELOPMENT CO., LTD., Shenzhen (CN)

(72) Inventors: Yongxin Jiang, Shenzhen (CN); Yiwen Yuan, Shenzhen (CN); Qilong Liao, Shenzhen (CN)

(73) Assignee: THINKCAR SOFTWARE TECHNOLOGY DEVELOPMENT CO., LTD., Shenzhen (CN)

( * ) Notice: Subject to any disclaimer, the term of this patent is extended or adjusted under 35 U.S.C. 154(b) by 0 days.

(21) Appl. No.: 19/103,230

(22) PCT Filed: May 26, 2023

(86) PCT No.: PCT/CN2023/096592

§ 371 (c)(1),
(2) Date: Feb. 11, 2025

(87) PCT Pub. No.: WO2024/037094

PCT Pub. Date: Feb. 22, 2024

(65) Prior Publication Data

US 2026/0056928 A1 Feb. 26, 2026

(30) Foreign Application Priority Data

Aug. 15, 2022 (CN) ........................ 202210971708.6

(51) Int. Cl.
*G06F 16/22* (2019.01)
*G06F 16/9537* (2019.01)

(52) U.S. Cl.
CPC ...... *G06F 16/2255* (2019.01); *G06F 16/9537* (2019.01)

(58) Field of Classification Search
CPC ........................ G06F 16/2255; G06F 16/9537
See application file for complete search history.

(56) References Cited

U.S. PATENT DOCUMENTS

2011/0225287 A1* 9/2011 Dalal .................... G06Q 10/10 709/224
2014/0101129 A1* 4/2014 Branish, II ........... G06F 16/972 707/E17.054

(Continued)

FOREIGN PATENT DOCUMENTS

CN 107622079 A 1/2018

OTHER PUBLICATIONS

The European search report of Counterpart European Patent Application No. 23854000.9 issued on Aug. 7, 2025.

*Primary Examiner* — Khanh B Pham
*Assistant Examiner* — Kweku William Halm

(57) ABSTRACT

Provided are device order data storage method and apparatus, and device order data query method and apparatus. The device order data storage method includes: acquiring target user identifier, target device identifier, device order information and software detail information corresponding to target device order data; for the device order information and the software detail information respectively, performing first hash modulo operation according to the target user identifier, to position target server; according to server identifier, current timestamp, the target device identifier and snowflake algorithm, generating information identifier corresponding to current information; performing second hash modulo operation on digit at specified bit in the information identifier, to position target database; according to the category of the current information and the current timestamp, positioning, from multiple information tables of the target database, target information table corresponding to target month for (Continued)

information storage; and storing multiple identifiers into specified database in associated manner.

8 Claims, 4 Drawing Sheets

(56) References Cited

U.S. PATENT DOCUMENTS

| | | | | |
|---|---|---|---|---|
| 2015/0095346 | A1 | 4/2015 | Kimmel et al. | |
| 2016/0094531 | A1* | 3/2016 | Unnikrishnan | H04L 63/08<br>726/7 |

* cited by examiner

DEVICE ORDER DATA STORAGE METHOD AND APPARATUS, AND DEVICE ORDER DATA QUERY METHOD AND APPARATUS

CROSS-REFERENCE TO RELATED APPLICATION

The present disclosure claims the priority to the Chinese patent application with the filling No. 202210971708.6 filed with the Chinese Patent Office on Aug. 15, 2022, and entitled "DEVICE ORDER DATA STORAGE METHOD AND APPARATUS, AND DEVICE ORDER DATA QUERY METHOD AND APPARATUS", the contents of which are incorporated herein by reference in entirety.

TECHNICAL FIELD

The present disclosure relates to the technology field of data processing, and particularly to a device order data storage method and an apparatus, and a device order data query method and an apparatus.

BACKGROUND ART

With the rapid development of society, technology has become increasingly advanced, information circulation is more convenient, and communication between individuals is closer. Big data, a product of this high-tech era and a result of a large population base, serves both as a resource and a lifeline.

As a resource, big data makes data analysis particularly significant. At this point, a problem arises: as the size of the data files to be analyzed grows larger, data reading becomes increasingly difficult. It is impractical to endlessly increase hardware costs to accommodate the growing volume of data reading. Therefore, data splitting has become an urgent necessity.

Examples of data splitting are ubiquitous in daily life. Supermarkets categorize and display products by type, and courier collection points store parcels separately by date and courier company. In the eyes of programmers, data is stored in tables. Each table has a storage capacity limit. When it is anticipated that a table involved in a particular business may reach its limit, splitting the table—and consequently, the data—becomes a necessary consideration.

Currently, most data storage methods classify and store data according to data attributes. The data attributes include the data generation date, data source, and data type, for instance, splitting data by generation date, such as creating a new table for each month or week, or splitting data by source, such as storing data from different data sources in different data tables. However, storing data in the above data classification storage method cannot effectively deal with data bottlenecks. They also pose significant inconveniences during data queries, failing to meet the demand for real-time data retrieval.

SUMMARY

The objective of the present disclosure is to provide a device order data storage method and an apparatus, and a device order data query method and an apparatus, which can deal with a data bottleneck, does not affect a data statistics requirement, and facilitates subsequent extension.

In a first aspect, the embodiments of the present disclosure provide a device order data storage method, wherein the method includes: obtaining target device order data, wherein the target device order data comprises: a target user identifier, a target device identifier, device order information, and software detail information; respectively taking the device order information and the software detail information as current information, and performing following storage steps: performing a first hash modulo operation according to the target user identifier to position a target server; obtaining a current timestamp and a server identifier of the target server; according to the server identifier, the current timestamp, the target device identifier and a snowflake algorithm, randomly generating an information identifier corresponding to the current information, wherein the information identifier is in decimal encoding; performing a second hash modulo operation on a digit at a specified bit in the information identifier, to position a target database in the target server; according to a category of the current information and the current timestamp, positioning, from multiple information tables of the target database, a target information table corresponding to a target month; storing the current information and the information identifier corresponding to the current information in the target information table; and storing the target user identifier, a first information identifier corresponding to the device order information, and a second information identifier corresponding to the software detail information in association in a designated database.

In a preferred embodiment of the present disclosure, the above step of performing a first hash modulo operation according to the target user identifier to position a target server includes: obtaining an ASCII code value corresponding to each character in the target user identifier; performing a first hash operation based on the ASCII code values corresponding to multiple characters, to obtain a first decimal hash value; applying the first decimal hash value to perform a first modulo operation on a number of servers, to obtain server location information; and determining the target server based on the server location information.

In a preferred embodiment of the present disclosure, the above step of performing a first hash operation based on the ASCII code values corresponding to multiple characters, to obtain a first decimal hash value comprises: calculating the first decimal hash value according to following formula:

$$Y_{n+1} - K \times Y_n + X_n,$$

where the first decimal hash value after a n-th character operation is represented by $Y_{n+1}$, a decimal hash value after a (n−1)-th character operation is represented by $Y_n$, the ASCII code value corresponding to the n-th character is represented by $X_n$, $Y_1=0$, K represents a constant coefficient, n=1, 2, 3 . . . N, and N represents a total number of characters.

In a preferred embodiment of the present disclosure, the above step of according to a server identifier, a current timestamp, the target device identifier and a snowflake algorithm, randomly generating an information identifier corresponding to current information comprises: taking the target device identifier as a fixed serial number, and based on the server identifier, the current timestamp, and the fixed serial number, randomly generating a binary encoding of a specified number of digits through the snowflake algorithm; and converting the binary encoding into decimal encoding to obtain the information identifier corresponding to the current information.

In a preferred embodiment of the present disclosure, the above step of performing a second hash modulo operation on a digit at a specified bit in the information identifier, to position a target database comprises: obtaining the ASCII code value corresponding to the digit at a specified bit in the information identifier; performing a second hash operation based on the ASCII code values corresponding to multiple digits, to obtain a second decimal hash value; applying the second decimal hash value to perform a second modulo operation on a number of databases in the target server, to obtain database location information; and determining the target database in the target server based on the database location information.

In a preferred embodiment of the present disclosure, the above step of according to a category of the current information and the current timestamp, positioning, from multiple corresponding information tables of the target database, a target information table corresponding to a target month comprises: determining the target month based on the current timestamp; determining, from multiple information tables of the target database, the plurality of information tables corresponding to the target month; and according to a category of the current information, determining the target information table from the multiple information tables corresponding to the target month.

In a second aspect, the embodiments of the present disclosure provide a device order data query method. The method is applied to a server, the server stores data saved using the device order data storage method as described in the first aspect, and the method comprises: obtaining a query request for the target device order data, wherein the query request carries the target user identifier; retrieving, from a designated database, the first information identifier corresponding to the device order information associated with the target user identifier and the second information identifier corresponding to the software detail information based on the target user identifier; and respectively using the first information identifier and the second information identifier as current identifiers, performing reverse resolution based on the current identifiers to determine the information table corresponding to the target month in the target database of the target server; and reading the information corresponding to the current identifiers from the information table corresponding to the target month.

In a preferred embodiment of the present disclosure, the above step of performing reverse resolution based on the current identifiers to determine the information table corresponding to the target month in the target database of the target server comprises: decrypting the current identifier to obtain the target server identifier and the target timestamp; determining the target server corresponding to the target server identifier; performing a hash modulo operation on the digit at a specified bit in the current identifier to determine the target database in the target server; and locating the information table corresponding to the target month from the multiple information tables corresponding to the target database based on the target timestamp.

In a third aspect, the embodiments of the present disclosure provide a device order data storage apparatus, and the apparatus includes: a data acquisition module, configured for obtaining target device order data, wherein the target device order data comprises: a target user identifier, a target device identifier, device order information, and software detail information; a first data storage module, configured for respectively taking the device order information and the software detail information as current information, and performing following storage steps: a first hash modulo module performing a first hash modulo operation according to the target user identifier to position a target server; an information identifier generation module obtaining a current timestamp and a server identifier of the target server; according to the server identifier, the current timestamp, the target device identifier and a snowflake algorithm, randomly generating an information identifier corresponding to the current information, wherein the information identifier is in decimal encoding; a second hash modulo module performing a second hash modulo operation on a digit at a specified bit in the information identifier, to position a target database in the target server; an information table location module according to a category of the current information and the current timestamp, positioning, from multiple information tables of the target database, a target information table corresponding to a target month; a data storage sub-module storing the current information and the information identifier corresponding to the current information in the target information table; and a second data storage module storing the target user identifier, a first information identifier corresponding to the device order information, and a second information identifier corresponding to the software detail information in association in a designated database.

In a fourth aspect, the embodiments of the present disclosure provide a device order data query apparatus. The apparatus is applied to a server, the server stores data saved using the device order data storage method as described in the first aspect, and the apparatus comprises: a request acquisition module, configured for obtaining a query request for the target device order data, wherein the query request carries the target user identifier; an identifier lookup module, configured for retrieving, from a designated database, the first information identifier corresponding to the device order information associated with the target user identifier and the second information identifier corresponding to the software detail information based on the target user identifier; and a data reading module, configured for respectively using the first information identifier and the second information identifier as current identifiers, performing reverse resolution based on the current identifiers to determine the information table corresponding to the target month in the target database of the target server; and reading the information corresponding to the current identifiers from the information table corresponding to the target month.

In a fifth aspect, the embodiments of the present disclosure also provide an electronic device comprising a processor and a memory, wherein the memory stores computer-executable instructions capable of being executed by the processor, and the processor executes the computer-executable instructions to implement the method of the first aspect described above.

In a sixth aspect, the embodiments of the present disclosure also provide a computer-readable storage medium, wherein the computer-readable storage medium stores computer-executable instructions, when invoked and executed by a processor, it prompts the processor to implement the method described in the first aspect above.

The embodiments of the present disclosure provide a device order data storage method and apparatus, and a device order data query method and apparatus. The device order data storage method includes firstly, obtaining target device order data, wherein the target device order data comprises: a target user identifier, a target device identifier, device order information, and software detail information; respectively taking the device order information and the software detail information as current information, and performing following storage steps: performing a first hash modulo operation according to the target user identifier to position a target server; then, according to a server identifier of the target server, a current timestamp, the target device identifier, and a snowflake algorithm, randomly generating a decimal information identifier corresponding to current information; then, performing a second hash modulo operation on a digit at a specified bit in the information identifier, to position a target database in the target server; then, according to a category of the current information and the current timestamp, positioning, from multiple information tables of the target database, a target information table corresponding to a target month; finally, storing the current information and the information identifier corresponding to the current information in the target information table; and storing the target user identifier, a first information identifier corresponding to the device order information, and a second information identifier corresponding to the software detail information in association in a designated database. In the embodiments of the present disclosure, by combining the user identifier, device identifier, and timestamp, through two hash modulo operations and one snowflake algorithm, the target location where the two types of information in the device order data should be stored is finally located, that is, the target information table in the target database in the target server. This data storage method can alleviate the database storage bottleneck problem in existing technologies, meet the requirements for data analysis, and facilitate subsequent data storage expansion.

BRIEF DESCRIPTION OF DRAWINGS

In order to more clearly illustrate the specific embodiments of the present disclosure or the technical solution in the prior art, the drawings required to be used in the description of the specific embodiment or the prior art will be briefly introduced as follows. Obviously, the drawings described below are some embodiments of the present disclosure. Those of ordinary skill in the art, without paying inventive labor, may also obtain other drawings according to these drawings.

DETAILED DESCRIPTION OF EMBODIMENTS

Figures 1, 2:
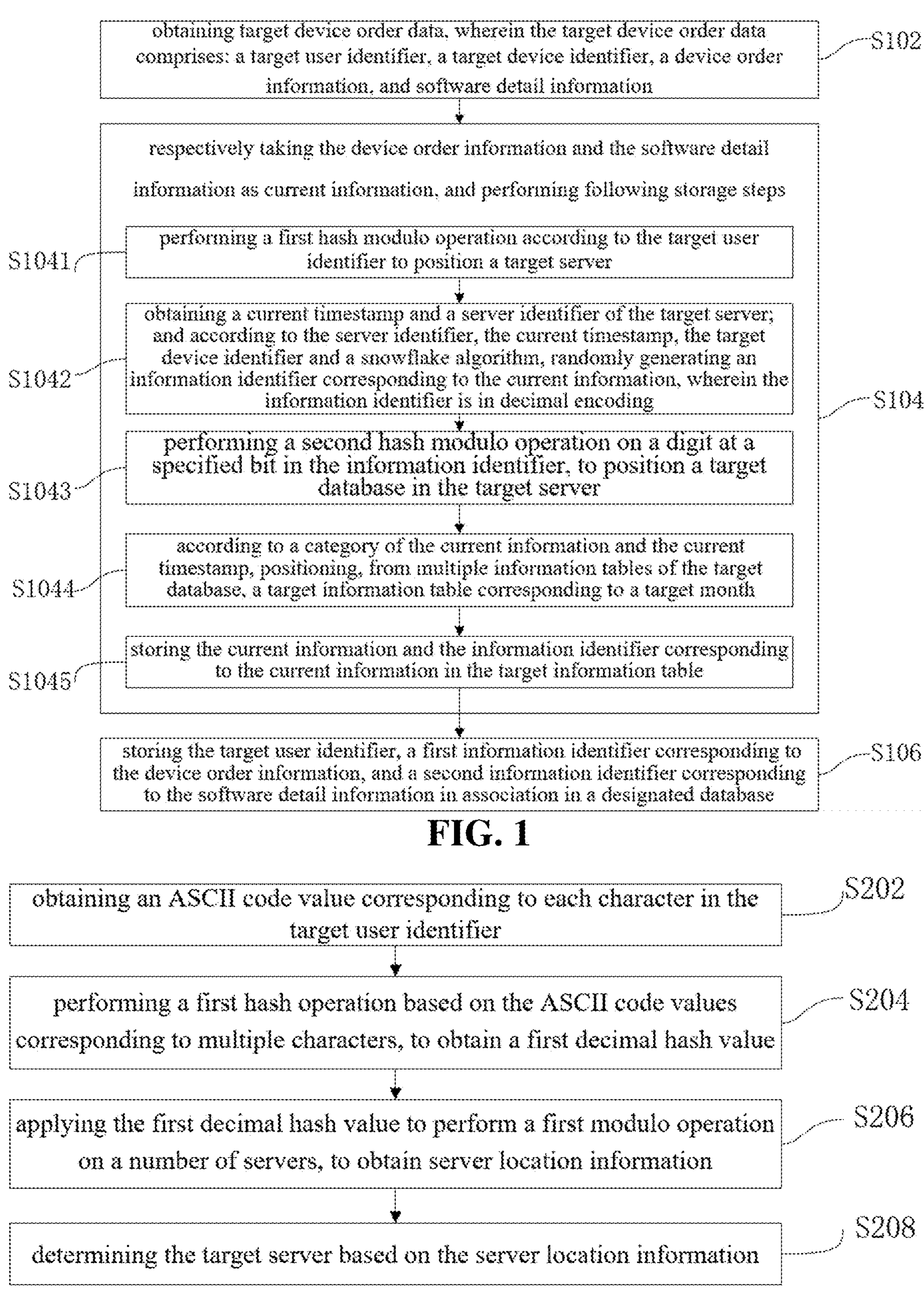
FIG. 1 is a flowchart of a device order data storage method provided in the embodiment of the present disclosure.
FIG. 2 is a flowchart of a target server determination process in a device order data storage method provided in the embodiment of the present disclosure.

A clear and complete description of the technical solutions of the present disclosure will be given below in connection with embodiments that are clearly part of and not all of the embodiments of the present disclosure. Based on the embodiments of the present disclosure, all other embodiments obtained by those skilled in the art without paying inventive effort shall fall within the protection scope of the present disclosure.

In the prior art, data storage methods often include classifying and storing data based on data attributes, where data attributes include the data generation date, data source, or data type. For example, for splitting data by date, SMS records for a phone number in April are stored in mobile_mess_4, and the data in May are stored in mobile_mess_5. While this approach can mitigate the storage bottleneck problem of data tables to some extent, it still faces challenges when a particular month has an excessive amount of information, leading to storage bottlenecks in the data table. Additionally, querying all SMS records for a specific phone number becomes difficult. For another example, for splitting data by source, SMS records for a phone number originating from contacts in the address book are stored in the mobile_mess_friends table, and SMS from non-contacts are stored in the mobile_mess_stranger table. This makes it convenient to query SMS from contacts, and this also makes it convenient to query SMS from non-contacts. However, querying all SMS within a specific time period requires aggregating data from both tables. Therefore, storing data in the above data classification storage method cannot effectively deal with data bottlenecks. They also pose significant inconveniences during data queries, failing to meet the demand for real-time data retrieval.

Based on this, the embodiment of the present disclosure provides a device order data storage method and an apparatus, and a device order data query method and an apparatus, which can deal with a data bottleneck, does not affect a data statistics requirement, and facilitates subsequent extension. For a better understanding of the embodiment, the device order data storage method disclosed in the embodiment of the present disclosure will be presented first.

In businesses of some companies, there can be millions or even more devices, corresponding to millions of user data, order data, and their corresponding product data. The product data can be the software product data purchased by a user for a corresponding device. Therefore, when storing device order data, tens of millions of data will be processed simultaneously, which is highly challenging for management and expansion. Due to the massive volume of data, a significant amount of time is required for comparison and retrieval during searches. Based on this, the embodiments of the present disclosure provide a device order data storage method to alleviate the database storage bottleneck issue when storing large amounts of data, meet data analysis requirements, and facilitate subsequent data storage expansion.

Referring to FIG. 1, FIG. 1 is a flowchart of a device order data storage method provided in the embodiment of the present disclosure. The method specifically includes the following steps.

Step S102, obtaining target device order data, wherein the target device order data comprises: a target user identifier, a target device identifier, device order information, and software detail information.

The application scenario in the embodiment is that a user purchases a software product for a device. Therefore, the above target device order data can include: a target user identifier, a target device identifier, device order information, and software detail information. The device order information includes: the number of software products purchased for the device, the transaction amount, the software type, etc. The software detail information includes: detailed data for each purchased software product, such as usage instructions, validity period, and more.

For the aforementioned device order information and software detail information, the embodiment requires separate storage for both types of information. The specific storage process is as follows.

Step S104: respectively taking the device order information and the software detail information as current information, and performing following storage steps.

Step S1041: performing a first hash modulo operation according to the target user identifier to position a target server.

The above target user identifier can be a string composed of arbitrary characters, and the characters include letters, numbers, special symbols, and so on. For example, if the target user identifier is "XiaoMing", then a first hash modulo operation is further performed on the identifier to locate the target server. The hash modulo operation includes performing a hash operation on the identifier and then performing the modulo operation on the value after the hash operation with the number of servers. It should be noted that the number of servers mentioned above is the current number of servers that can currently store data. If the number of servers changes, the number of servers will be updated in real-time.

Step S1042: obtaining a current timestamp and a server identifier of the target server; and according to the server identifier, the current timestamp, the target device identifier, and a snowflake algorithm, randomly generating an information identifier corresponding to the current information, wherein the information identifier is in decimal encoding.

After locating the target server, further, the identifier of the server is obtained, and the current timestamp is obtained to facilitate subsequent snowflake algorithm operations.

Using the snowflake algorithm typically generates a 64-bit binary code (e.g., 00010011 00000100 01100011 01010111 00000110 01100100 01100101 00101000), which is then converted into a decimal code, such as 13046355706646528.

Step S1043: performing a second hash modulo operation on a digit at a specified bit in the information identifier, to position a target database in the target server.

The aforementioned digit at a specified bit can include the last digits of the information identifier, the first digits, the middle digits, or a digit string obtained by taking one digit from every few digits. The second hash modulo operation is similar to the aforementioned first hash modulo operation, with the difference being that the first hash modulo operation uses the target user identifier and the number of servers, whereas the second hash modulo operation uses the above information identifier and the number of databases in the target server. The specific calculation process is described in detail later.

Step S1044: according to a category of the current information and the current timestamp, positioning, from multiple information tables of the target database, a target information table corresponding to a target month.

The above-mentioned current timestamp can be directly converted into a specific time, allowing the corresponding month to be determined. This further determines the corresponding information table for the month in the target database. Typically, the information table for a month is divided into multiple tables based on the information category. In the embodiment, there are two types of tables: order table and detail table, where the order table is used to store device order information, and the detail table is used to store software detail information. Based on the category of the current information, it can be determined which table under the target month the current information will be stored in.

Step S1045: storing the current information and the information identifier corresponding to the current information in the target information table. Through the steps described above, the device order information and software detail information can be stored in the corresponding target information tables, and the corresponding information identifiers can be stored at the same time.

Step S106: storing the target user identifier, a first information identifier corresponding to the device order information, and a second information identifier corresponding to the software detail information in association in a designated database.

In order to facilitate data query, it is also necessary to associate and store the above-mentioned target user identifier, the first information identifier corresponding to the device order information, and the second information identifier corresponding to the software detail information, which can be stored in an intermediate table of a specified database. In this way, if the target user identifier is known, the first information identifier corresponding to the device order information and the second information identifier corresponding to the software detail information can be directly found. By performing reverse resolution on the first information identifier and the second information identifier, the specific storage location of the device order information and the software detail information can be determined.

In the device order data storage method provided in the embodiments of the present disclosure, first, the target device order data is obtained. The target device order data includes: a target user identifier, a target device identifier, device order information, and software detail information. The device order information and the software detail information are respectively taken as current information, and the following storage steps are executed: performing a first hash modulo operation according to the target user identifier to position a target server; then, according to a server identifier of the target server, a current timestamp, the target device identifier, and a snowflake algorithm, randomly generating a decimal information identifier corresponding to current information; then, performing a second hash modulo operation on a digit at a specified bit in the information identifier, to position a target database in the target server; then, according to a category of the current information and the current timestamp, positioning, from multiple information tables of the target database, a target information table corresponding to a target month; finally, storing the current information and the information identifier corresponding to the current information in the target information table; and storing the target user identifier, a first information identifier corresponding to the device order information, and a second information identifier corresponding to the software detail information in association in a designated database. In the embodiments of the present disclosure, by combining the user identifier, device identifier, and timestamp, through two hash modulo operations and one snowflake algorithm, the target location where the two types of information in the device order data should be stored is finally located, that is, the target information table in the target database in the target server. This data storage method can alleviate the database storage bottleneck problem in existing technologies, meet the requirements for data analysis, and facilitate subsequent data storage expansion.

Based on the above-described method embodiment, the embodiment of the present disclosure further provides a device order data storage method, wherein the method is implemented on the basis of the previous embodiment. The embodiment focuses on describing the hash modulo operation process and the final storage location determination process.

Referring to FIG. 2, the aforementioned first hash modulo operation based on the target user identifier to locate the target server specifically includes the following steps.

Step S202: obtaining an ASCII code value corresponding to each character in the target user identifier.

Step S204: performing a first hash operation based on the ASCII code values corresponding to multiple characters, to obtain a first decimal hash value, and specifically, calculating the first decimal hash value according to following formula:

$$Y_{n+1} - K \times Y_n + X_n,$$

where the first decimal hash value after a n-th character operation is represented by $Y_{n+1}$, a decimal hash value after a (n−1)-th character operation is represented by $Y_n$, the ASCII code value corresponding to the n-th character is represented by $X_n$, $Y_1=0$, K represents a constant coefficient, n=1, 2, 3 . . . N, and N represents a total number of characters.

The following are two specific examples.

For instance, the aforementioned target user identifier is "123", and the corresponding ASCII values for the identifier "123" are 49, 50, and 51, respectively; taking the constant coefficient K as 31 as an example:

$$\text{the first calculation: } 31 * 0 + 49 = 49;$$

$$\text{the second calculation: } 31 * 49 + 50 = 1569;$$

$$\text{and the third calculation: } 31 * 1569 + 51 = 48690.$$

In other words, after performing a hash operation on the target user identifier 123, the resulting decimal hash value is 48690.

For instance, the aforementioned target user identifier is "abc", and the corresponding ASCII values for "abc" are 97, 98, and 99, respectively;

$$\text{the first calculation: } 31 * 0 + 97 = 97;$$

$$\text{the second calculation: } 31 * 97 + 98 = 3105;$$

$$\text{and the third calculation: } 31 * 3105 + 99 = 96354.$$

In other words, after performing a hash operation on the target user identifier "abc", the resulting decimal hash value is 96354.

Step S206: applying the first decimal hash value to perform a first modulo operation on a number of servers, to obtain server location information.

Step S208: determining the target server based on the server location information.

Taking the aforementioned target user identifier "123" as an example, after performing the hash operation on "123", the resulting decimal hash value is 48690. Assuming the number of servers is 8, the possible remainders are 0 to 7, each corresponding to one of the 8 servers. Dividing 48690 by 8 obtains a remainder of 2, and the remainder, 2, is used as the server location information. In other words, the (2+1)=3rd server among the 8 servers is selected as the target server.

The step of according to a server identifier, a current timestamp, the target device identifier and a snowflake algorithm, randomly generating an information identifier corresponding to current information specifically includes the following steps.

Taking the target device identifier as a fixed serial number, and based on the server identifier, the current timestamp, and the fixed serial number, randomly generating a binary encoding of a specified number of digits through the snowflake algorithm; and converting the binary encoding into decimal encoding to obtain the information identifier corresponding to the current information.

The principle of the snowflake algorithm is to generate a unique 64-bit long-type ID. The highest bit is fixed at 0 because the generated ID is a positive integer. If it were 1, the ID would become negative. The next 41 bits store a millisecond-level timestamp, 2^41/(1000*60*60*24*365) =69, which can be used for about 69 years. The following 10 bits store a machine code, including 5 bits for machine ID and 5 bits for service ID. This allows for a maximum deployment of 2^10=1024 machines. The last 12 bits store a sequence number. For the same millisecond-level timestamp, this incrementing sequence number is used to ensure uniqueness. In other words, for a single machine, within the same millisecond, it can generate up to 2^12=4096 unique IDs.

For each snowflake algorithm service, a 10-bit machine code needs to be specified first. This code can be defined based on specific business requirements. For instance, it can be a combination of data center ID+machine ID, machine ID+service ID, or any other 10-bit integer value that can distinguish the other identifiers. In the embodiment, a 5-bit machine ID and a 5-bit service ID are determined based on the above target server identifier; a 12-bit storage sequence number is determined based on the target device identifier.

Figure 3:
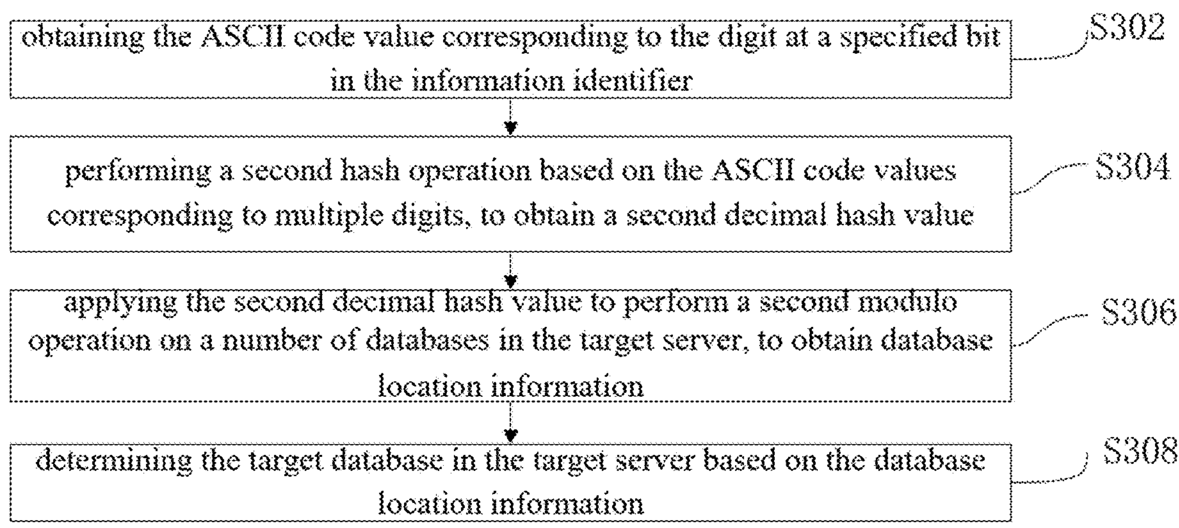
FIG. 3 is a flowchart of a target database determination process in a device order data storage method provided in the embodiment of the present disclosure.

In a preferred embodiment of the present disclosure, referring to FIG. 3, the above step of performing a second hash modulo operation on a digit at a specified bit in the information identifier to position a target database specifically includes the following steps.

Step S302: obtaining the ASCII code value corresponding to the digit at a specified bit in the information identifier.

Step S304: performing a second hash operation based on the ASCII code values corresponding to multiple digits, to obtain a second decimal hash value.

Step S306: applying the second decimal hash value to perform a second modulo operation on a number of databases in the target server, to obtain database location information.

Step S308: determining the target database in the target server based on the database location information.

This process is similar to the method of locating the target server described earlier and will not be repeated herein.

In a preferred embodiment of the present disclosure, the above step of according to a category of the current information and the current timestamp, positioning, from multiple corresponding information tables of the target database, a target information table corresponding to a target month comprises:

(1) determining the target month based on the current timestamp;

(2) determining, from multiple information tables of the target database, the plurality of information tables corresponding to the target month; and (3) according to a category of the current information, determining the target information table from the multiple information tables corresponding to the target month.

As device order data includes device order information (such as quantity, amount, time, etc.) and software detail information (such as software expiration time, software installation method, and software product development company, etc.), a complete set of device order data contains a dozen or more than twenty pieces of data. Therefore, data splitting is required during data storage.

The above device order data includes a target user identifier, wherein the target user identifier is the username of the user purchasing software for the target device, such as "abc". If the target user identifier is a Chinese name, such as "小明", it can be converted into Pinyin "XiaoMing" for subsequent processing.

Figure 4:
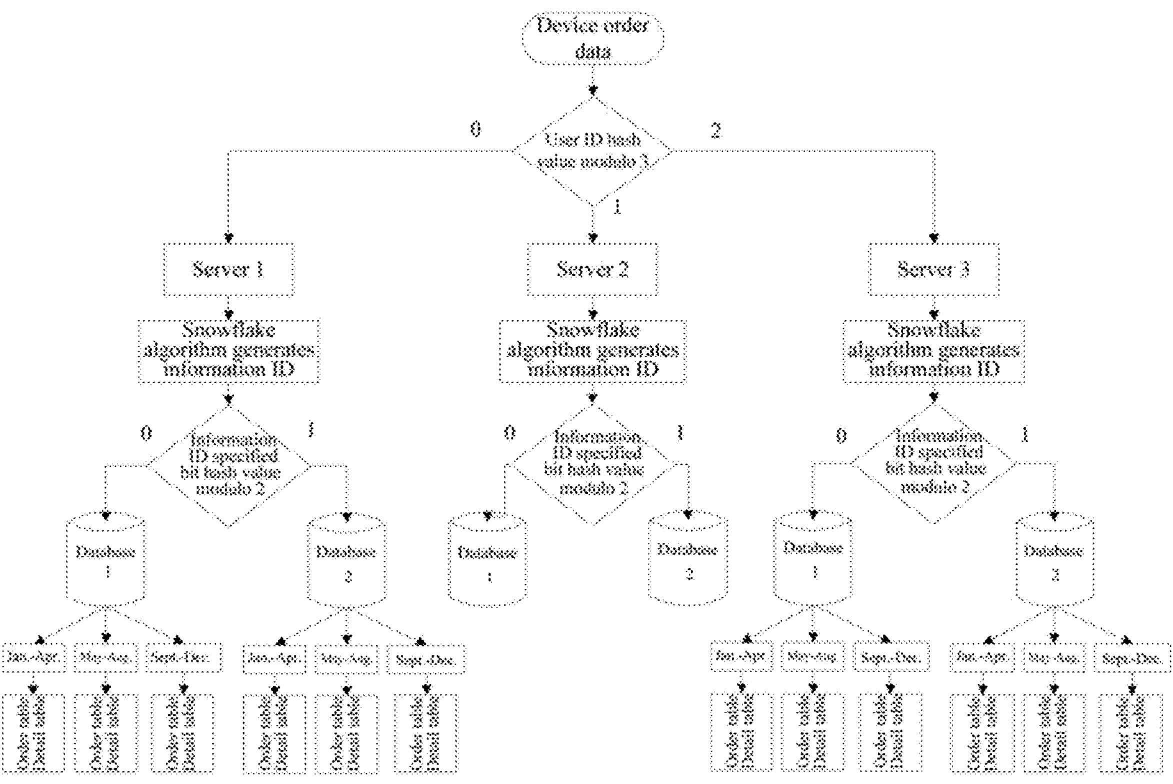
FIG. 4 is a schematic diagram of hierarchical storage in a device order data storage method provided in the embodiment of the present disclosure.

Taking the determination of the storage location for software detail information as an example, as shown in FIG. 4, three servers are provided, wherein each server includes two databases, and each database includes information tables divided by month, such as order tables and detail tables (for clarity, the information tables in the databases of server 2 are not shown, but they are the same as those in server 1 and server 3). Assuming the data to be stored is the software detail information in the device order data, and the user identifier is "abc", the hash operation is performed on the user identifier "abc" to yield 96354. The modulo operation is performed on the number of servers, 3, to obtain the remainder 0 (wherein remainder 0 corresponds to the first server, remainder 1 corresponds to the second server, and remainder 2 corresponds to the third server). Thus, the first server among the three servers, that is, the server 1, is used as the target server. Next, the identifier of the server 1, the current timestamp, and a fixed serial number determined by the target device identifier are obtained. The snowflake algorithm is used to generate an initial information ID, and the initial information ID is a 64-bit binary encoding. The binary encoding is then converted into a decimal encoding, thus obtaining the first information identifier ID1 corresponding to the software detail information. The last 5 digits of the above decimal encoding are performed with the hash operation, and the resulting hash value is modulo 2 (i.e., the number of databases in the server 1). Assuming the result is 1, the second database in the server 1, i.e., the database 2, is selected as the target database. Furthermore, based on the current timestamp, the current month is determined. For example, assuming the current month is September, the software detail information and the first information identifier ID1 are stored in the detail table corresponding to September.

Similarly, the storage location for device order information can also be determined. The process is similar to the above and will not be repeated herein.

Additionally, it is necessary to store the target user identifier "abc", the first information identifier ID1 corresponding to the software detail information, and the second information identifier ID2 corresponding to the device order information in a middle table in other databases. Through the associated storage of the three identifiers, an ID is 20 bytes in size, a piece of device order data corresponds to 60 bytes, and a million pieces of data only take up about 6M, which can facilitate subsequent business data queries.

The order data storage method provided in the embodiments of the present disclosure uses multiple hash modulo operations to determine storage locations to evenly distribute the data across servers and prevent malicious data scraping. A snowflake algorithm with added timestamps is used to randomly generate IDs. In the embodiments of the present disclosure, by combining the user identifier, device identifier, and timestamp, through two hash modulo operations and one snowflake algorithm, the target location where the two types of information in the device order data should be stored is finally located, that is, the target information table in the target database in the target server. This data storage method can alleviate the database storage bottleneck problem in existing technologies, meet the requirements for data analysis, and facilitate subsequent data storage expansion.

In the embodiment, disorganized device order data is split and evenly stored in multiple servers, multiple databases, and multiple tables. Compared to storing data in a single table on one server, this approach effectively solves database storage bottleneck issues. For the case where the data is stored on one server, as the volume of the subsequent order increases, the time required for the system to retrieve information increases, leading to system crashes. The losses caused by crashes are immeasurable. By using the present method to split and store the data, the risk of system crashes is reduced, information management and retrieval are facilitated, and malicious scraping of order information is avoided.

Figure 5:
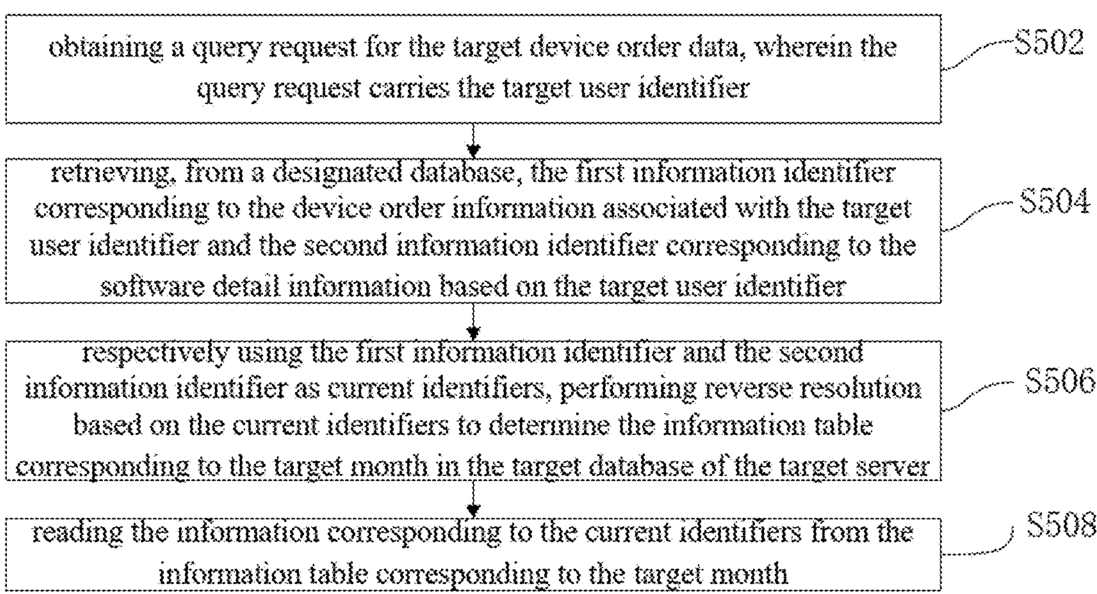
FIG. 5 is a flowchart of a device order data query method provided in the embodiment of the present disclosure.

Based on the above-mentioned embodiment of the device order data storage method, the embodiment of the present disclosure provides a device order data query method. The method is applied to a server, the server stores data saved using the device order data storage method as described in the first aspect. As shown in FIG. 5, the method specifically includes the following steps.

Step S502: obtaining a query request for the target device order data, wherein the query request carries the target user identifier.

Step S504: retrieving, from a designated database, the first information identifier corresponding to the device order information associated with the target user identifier and the second information identifier corresponding to the software detail information based on the target user identifier.

Step S506: respectively using the first information identifier and the second information identifier as current identifiers, performing reverse resolution based on the current identifiers to determine the information table corresponding to the target month in the target database of the target server.

Specifically, it is achieved through the following steps:

(1) decrypting the current identifier to obtain the target server identifier and the target timestamp;

(2) determining the target server corresponding to the target server identifier;

(3) performing a hash modulo operation on the digit at a specified bit in the current identifier to determine the target database in the target server, wherein it should be noted that the method for determining the digit at a specified bit here is consistent with the method for determining the digit at a specified bit in the previous embodiment, and the hash modulo operation is the same as the second hash modulo operation in the aforementioned storage method, that is, performing a second modulo operation on the number of databases in the target server to ensure that the determined target database is consistent with the target database during storage; and (4) locating the information table corresponding to the target month from the multiple information tables corresponding to the target database based on the target timestamp.

Step S508: reading the information corresponding to the current identifiers from the information table corresponding to the target month.

The following is an example of querying device order information in the device order data. Referring to FIG. 4, when using the first information identifier ID1 to obtain the device order information of the users, ID1 can be decrypted to obtain the target server identifier and the target timestamp. Through the target server identifier, the target server can be determined, such as server 1. Then, a hash modulo operation is performed on the last five digits of ID1, which can determine the target database in server 1, such as database 2. Based on the target timestamp, the target month can be determined, for example, September. Finally, the device order information corresponding to the first information identifier ID1 can be read from the order table corresponding to September.

For example, when a query request carries a target user identifier, the first information identifier ID1 and the second information identifier ID2 associated with the target user identifier can first be found in the aforementioned intermediate table. Then, the device order information corresponding to the first information identifier ID1 and the software detail information corresponding to the second information identifier ID2 can be respectively searched according to the above process.

In the device order data query method provided in the embodiment of the present disclosure, the disorganized device order data is split and evenly stored in multiple servers, multiple databases, and multiple tables, facilitating user data queries.

Figure 6:
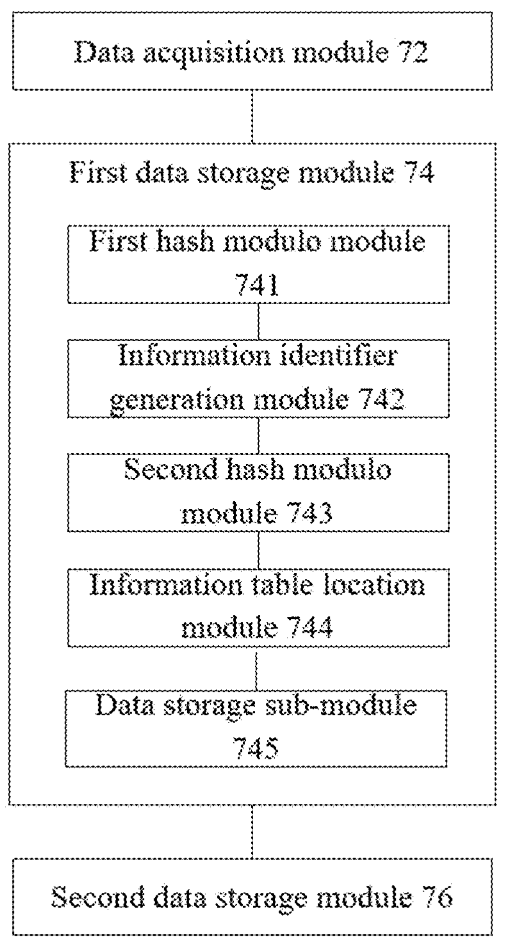
FIG. 6 is a structural block diagram of a device order data storage apparatus provided in the embodiment of the present disclosure.

Based on the above-mentioned device order data storage method, the embodiment of the present disclosure provides a device order data storage apparatus. Referring to FIG. 6, the apparatus includes:

a data acquisition module 72, configured for obtaining target device order data, wherein the target device order data comprises: a target user identifier, a target device identifier, device order information, and software detail information;

a first data storage module 74, configured for respectively taking the device order information and the software detail information as current information, and performing following storage steps: a first hash modulo module 741 performing a first hash modulo operation according to the target user identifier to position a target server; an information identifier generation module 742 obtaining a current timestamp and a server identifier of the target server; according to the server identifier, the current timestamp, the target device identifier and a snowflake algorithm, randomly generating an information identifier corresponding to the current information, wherein the information identifier is in decimal encoding; a second hash modulo module 743 performing a second hash modulo operation on a digit at a specified bit in the information identifier, to position a target database in the target server; an information table location module 744 according to a category of the current information and the current timestamp, positioning, from multiple information tables of the target database, a target information table corresponding to a target month; a data storage sub-module 745 storing the current information and the information identifier corresponding to the current information in the target information table; and a second data storage module 76, configured for storing the target user identifier, a first information identifier corresponding to the device order information, and a second information identifier corresponding to the software detail information in association in a designated database.

In a preferred embodiment of the present disclosure, the above first hash modulo module 741 is configured for obtaining an ASCII code value corresponding to each character in the target user identifier; performing a first hash operation based on the ASCII code values corresponding to multiple characters, to obtain a first decimal hash value; applying the first decimal hash value to perform a first modulo operation on a number of servers, to obtain server location information; and determining the target server based on the server location information.

In a preferred embodiment of the present disclosure, the above first hash modulo module 741 is configured for calculating the first decimal hash value according to following formula:

$$Y_{n+1} - K \times Y_n + X_n,$$

where the first decimal hash value after a n-th character operation is represented by $Y_{n+1}$, a decimal hash value after a (n−1)-th character operation is represented by $Y_n$, the ASCII code value corresponding to the n-th character is represented by $X_n$, $Y_1=0$, K represents a constant coefficient, n=1, 2, 3 . . . N, N represents a total number of characters.

In a preferred embodiment of the present disclosure, the above information identifier generation module 742 is configured for taking the target device identifier as a fixed serial number, and based on the server identifier, the current timestamp, and the fixed serial number, randomly generating a binary encoding of a specified number of digits through the snowflake algorithm, and converting the binary encoding into decimal encoding to obtain the information identifier corresponding to the current information.

In a preferred embodiment of the present disclosure, the above second hash modulo module 743 is configured for obtaining the ASCII code value corresponding to the digit at a specified bit in the information identifier; performing a second hash operation based on the ASCII code values corresponding to multiple digits, to obtain a second decimal hash value; applying the second decimal hash value to perform a second modulo operation on a number of databases in the target server, to obtain database location information; and determining the target database in the target server based on the database location information.

In a preferred embodiment of the present disclosure, the above information table location module 744 is configured for determining the target month based on the current timestamp; determining, from multiple information tables of the target database, the plurality of information tables corresponding to the target month; and according to a category of the current information, determining the target information table from the multiple information tables corresponding to the target month.

The device order data storage apparatus provided in the embodiment of the present disclosure has the same implementation principles and technical effects as the aforementioned embodiments of the device order data storage method. For brevity, aspects of the device order data storage apparatus not mentioned in this embodiment may refer to the corresponding content in the embodiments of the device order data storage method described above.

Figure 7:
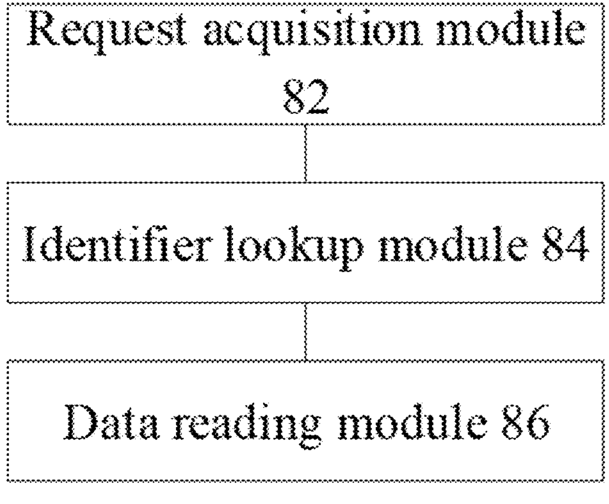
FIG. 7 is a structural block diagram of a device order data query apparatus provided in the embodiment of the present disclosure.

Based on the above-mentioned embodiment of the device order data query method, the embodiment of the present disclosure provides a device order data query apparatus. The apparatus is applied to a server, and the server stores data saved using the device order data storage method as described above. As shown in FIG. 7, the apparatus includes: a request acquisition module 82, configured for obtaining a query request for the target device order data, wherein the query request carries the target user identifier; an identifier lookup module 84, configured for retrieving, from a designated database, the first information identifier corresponding to the device order information associated with the target user identifier and the second information identifier corresponding to the software detail information based on the target user identifier; and a data reading module 86, configured for respectively using the first information identifier and the second information identifier as current identifiers, performing reverse resolution based on the current identifiers to determine the information table corresponding to the target month in the target database of the target server; and reading the information corresponding to the current identifiers from the information table corresponding to the target month.

In a preferred embodiment of the present disclosure, the above data reading module 86 is configured for decrypting the current identifier to obtain the target server identifier and the target timestamp; determining the target server corresponding to the target server identifier; performing a hash modulo operation on the digit at a specified bit in the current identifier to determine the target database in the target server; and locating the information table corresponding to the target month from the multiple information tables corresponding to the target database based on the target timestamp.

The device order data query apparatus provided in the embodiment of the present disclosure has the same implementation principles and technical effects as the aforementioned embodiments of the device order data query method. For brevity, aspects of the device order data query apparatus not mentioned in this embodiment may refer to the corresponding content in the embodiments of the device order data query method described above.

Figure 8:
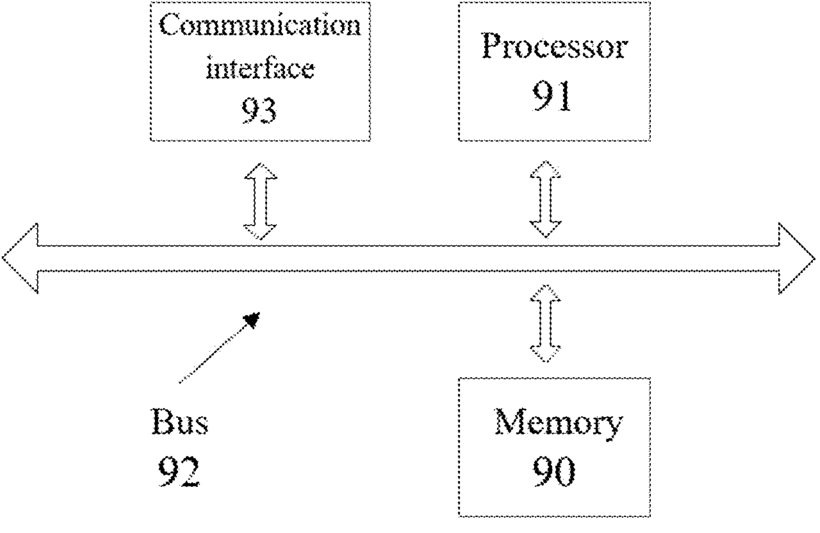
FIG. 8 is a schematic structural diagram of an electronic device provided by the embodiment of the present disclosure.

The embodiment of the present disclosure also provides an electronic device, as shown in FIG. 8, a schematic diagram of the structure of the electronic device, wherein the electronic device comprises a processor 91 and a memory 90, the memory 90 storing computer-executable instructions capable of being executed by the processor 91, the processor 91 executing the computer-executable instructions to implement the aforementioned method.

In the embodiment illustrated in FIG. 8, the electronic device further includes a bus 92 and a communication interface 93, wherein the processor 91, the communication interface 93, and the memory 90 are connected via the bus 92.

The memory 90 can comprise high-speed random access memory (RAM) and can also include non-volatile memory, such as at least one disk memory. The communication connection between the system network element and at least one other network element is achieved through at least one communication interface 93 (which can be wired or wireless), which can use the Internet, WAN, local network, metropolitan network, etc. The bus 92 can be an ISA (industry standard architecture) bus, a PCI (peripheral component interconnect) bus, an EISA (extended industry standard architecture) bus, and so on. The bus 92 can be divided into an address bus, a data bus, a control bus, etc. For ease of representation, only one bidirectional arrow is used in FIG. 8, but it does not indicate that there is only one bus or one type of bus.

The processor 91 can be an integrated circuit chip with signal processing capability. In the implementation process, the various steps of the above method can be accomplished through integrated logic circuits in the hardware of processor 91 or in the form of software instructions. The processor 91 mentioned above can be a general-purpose processor, comprising a central processing unit (CPU), a network processor (NP), etc. It can also be a digital signal processor (DSP), application-specific integrated circuit (ASIC), field-programmable gate array (FPGA); or other programmable logic devices, discrete gates, transistor logic devices, and discrete hardware components. The general-purpose processor can be a microprocessor, or the processor can also be any conventional processor, and so on. The steps of the method disclosed in the embodiments of the present disclosure can be directly implemented by execution through a hardware decoder processor or through a combination of hardware and software modules within the decoder processor. The software modules can be located in random access memory, flash memory, read-only memory, programmable read-only memory, electrically erasable programmable memory, registers, or other mature storage media in the field. The storage medium is located in the memory. The processor 91 reads information from the memory and completes the steps of the method of the above embodiment in combination with its hardware.

The embodiments of the present disclosure also provide a computer-readable storage medium, wherein the computer-readable storage medium stores computer-executable instructions. When the computer-executable instructions are invoked and executed by a processor, the computer-executable instructions cause the processor to implement the method described above. The specific implementations can be referred to in the method embodiments, and are not reiterated herein.

The computer program product of the method, apparatus, and electronic device provided by the embodiment of the present disclosure includes a computer-readable storage medium on which program code is stored. The program code includes instructions that can be used to perform the method described in the previous method embodiment, and the specific implementation can be referred to in the method embodiments, which are not repeated herein.

Unless otherwise specifically stated, the relative steps, numerical expressions, and values of the components and steps described in these embodiments do not limit the scope of the present disclosure.

When the functions are implemented as software functional units and sold or used as independent products, they can be stored in a processor-executable, non-volatile, computer-readable storage medium. Based on this understanding, the technical solution of the present disclosure, or the part that contributes to the prior art or the part of the technical solution, can be embodied in the form of a software product. The computer software product is stored in a storage medium and includes several instructions that cause a computer device (which can be a personal computer, server, or network device, etc.) to execute all or part of the steps of the methods described in the various embodiments of the present disclosure. The aforementioned storage media include various media that can store program code, such as USB drives, external hard drives, read-only memory (ROM), random access memory (RAM), disks, or optical discs.

In the description of the present disclosure, it should be noted that the terms "center", "top", "bottom", "left", "right", "vertical", "horizontal", "inside", "outside", etc. indicate an orientation or positional relationship based on the orientation or positional relationship shown in the accompanying drawings and are intended only to facilitate and simplify the description of the present disclosure, not to indicate or imply that the device or element referred to must have a particular orientation, be constructed and operate in a particular orientation, and therefore are not to be construed as limiting the present disclosure. In addition, the terms "first", "second", and "third" are used for descriptive purposes only and are not to be construed as indicating or implying relative importance.

Finally, it should be noted that the above-described embodiments are only specific embodiments of the present disclosure to illustrate the technical solutions of the present disclosure, and not to limit them. The scope of protection of the present disclosure is not limited thereto. Although the present disclosure is described in detail with reference to the foregoing embodiments, it should be understood by those of ordinary skill in the art that any person skilled in the art can still make modifications or easily envisage variations to the technical solutions described in the aforementioned embodiments within the technical scope disclosed by the present disclosure. Alternatively, some technical features can be equivalently substituted. These modifications, changes, or substitutions do not depart from the essence of the technical solutions of the embodiments of the present disclosure and its scope. All these should be encompassed within the scope of protection of the present disclosure. Therefore, the scope of protection of the present disclosure shall be stated to be subject to the scope of protection of the claims.

The invention claimed is:

1. A device order data storage method, implemented in a distributed database system comprising a plurality of servers, each server comprising a plurality of databases, wherein the method comprises:

obtaining target device order data at the plurality of servers of the distributed database system, wherein the target device order data comprises: a target user identifier, a target device identifier, device order information, and software detail information;

respectively taking the device order information and the software detail information as current information, and performing following storage steps:

performing a first hash modulo operation according to the target user identifier to position a target server from the plurality of servers of the distributed database system;

obtaining a current timestamp and a server identifier of the target server;

generating an information identifier corresponding to the current information based the server identifier, the current timestamp, the target device identifier and a snowflake algorithm, wherein the information identifier is in decimal encoding;

performing a second hash modulo operation on a digit at a specified bit in the information identifier, to position a target database from the plurality of databases in the target server;

according to a category of the current information and the current timestamp, positioning, from multiple information tables of the target database, a target information table corresponding to a target month;

storing the current information and the information identifier corresponding to the current information in the target information table; and storing the target user identifier, a first information identifier corresponding to the device order information, and a second information identifier corresponding to the software detail information in association in a designated database.

2. The method according to claim 1, wherein the step of performing a first hash modulo operation according to the target user identifier to position a target server comprises:

obtaining an ASCII code value corresponding to each character in the target user identifier;

performing a first hash operation based on ASCII code values corresponding to multiple characters, to obtain a first decimal hash value;

applying the first decimal hash value to perform a first modulo operation on the number of servers, to obtain server location information; and determining the target server based on the server location information.

3. The method according to claim 2, wherein the step of performing a first hash operation based on ASCII code values corresponding to multiple characters, to obtain a first decimal hash value comprises:

calculating the first decimal hash value according to following formula:

$$Y_{n+1} - K \times Y_n + X_n,$$

where the first decimal hash value after a n-th character operation is represented by $Y_{n+1}$, a decimal hash value after a (n−1)-th character operation is represented by $Y_n$, an ASCII code value corresponding to the n-th character is represented by $X_n$, $Y_1=0$, K represents a constant coefficient, n=1, 2, 3 . . . N, N represents a total number of characters.

4. The method according to claim 1, wherein the step of according to the server identifier, the current timestamp, the target device identifier and a snowflake algorithm, randomly generating an information identifier corresponding to the current information comprises:

taking the target device identifier as a fixed serial number, and based on the server identifier, the current timestamp, and the fixed serial number, randomly generating a binary encoding of a specified number of digits through the snowflake algorithm; and converting the binary encoding into a decimal encoding to obtain the information identifier corresponding to the current information.

5. The method according to claim 1, wherein the step of performing a second hash modulo operation on a digit at a specified bit in the information identifier, to position a target database comprises:

obtaining an ASCII code value corresponding to the digit at the specified bit in the information identifier;

performing a second hash operation based on ASCII code values corresponding to multiple digits, to obtain a second decimal hash value;

applying the second decimal hash value to perform a second modulo operation on the number of databases in the target server, to obtain database location information; and determining the target database in the target server based on the database location information.

6. The method according to claim 1, wherein the step of according to a category of the current information and the current timestamp, positioning, from multiple corresponding information tables of the target database, a target information table corresponding to a target month comprises:

determining the target month based on the current timestamp;

determining, from the multiple corresponding information tables of the target database, multiple information tables corresponding to the target month; and according to the category of the current information, determining the target information table from the multiple information tables corresponding to the target month.

7. A device order data query method, wherein the method is applied to a server, the server stores data saved using the device order data storage method according to claim 1, and the method comprises:

obtaining a query request for the target device order data, wherein the query request carries the target user identifier;

retrieving, from the designated database, the first information identifier corresponding to the device order information associated with the target user identifier and the second information identifier corresponding to the software detail information based on the target user identifier; and respectively using the first information identifier and the second information identifier as current identifiers, performing reverse resolution based on the current identifiers to determine the information table corresponding to the target month in the target database of the target server; and reading information corresponding to the current identifiers from the information table corresponding to the target month.

8. The method according to claim 7, wherein the step of performing reverse resolution based on the current identifiers to determine the information table corresponding to the target month in the target database of the target server comprises:

decrypting the current identifiers to obtain the target server identifier and the target timestamp;

determining the target server corresponding to the target server identifier;

performing a hash modulo operation on the digit at the specified bit in the current identifier to determine the target database in the target server; and locating the information table corresponding to the target month from the multiple information tables corresponding to the target database based on the target timestamp.

* * * * *